United States Patent
Janacek et al.

(10) Patent No.: US 8,447,967 B1
(45) Date of Patent: May 21, 2013

(54) CONTROLLED MESSAGE DISTRIBUTION

(75) Inventors: Robert Janacek, East Hanover, NJ (US); Mahesh Muchhala, Kenilworth, NJ (US)

(73) Assignee: DataMotion, Inc., Morristown, NJ (US)

( * ) Notice: Subject to any disclaimer, the term of this patent is extended or adjusted under 35 U.S.C. 154(b) by 2132 days.

(21) Appl. No.: 09/895,826

(22) Filed: Jun. 29, 2001

Related U.S. Application Data

(60) Provisional application No. 60/214,934, filed on Jun. 29, 2000.

(51) Int. Cl.
H04L 29/06 (2006.01)

(52) U.S. Cl.
USPC ............................................ 713/150; 726/15

(58) Field of Classification Search
USPC .......................... 709/206; 713/2, 150; 726/15
See application file for complete search history.

(56) References Cited

U.S. PATENT DOCUMENTS

| | | | |
|---|---|---|---|
| 5,230,048 A | 7/1993 | Moy | |
| 5,566,230 A | 10/1996 | Cairo | |
| 5,721,825 A | 2/1998 | Lawson et al. | |
| 5,781,901 A | 7/1998 | Kuzma | |
| 5,790,790 A | 8/1998 | Smith et al. | |
| 5,809,116 A | 9/1998 | Cairo | |
| 5,815,555 A | 9/1998 | Cairo | |
| D399,836 S | 10/1998 | Wu et al. | |
| 5,956,154 A | 9/1999 | Cairo | |
| 5,958,005 A * | 9/1999 | Thorne et al. | 709/202 |
| 5,961,590 A * | 10/1999 | Mendez et al. | 709/206 |
| 6,058,168 A | 5/2000 | Braband | |
| 6,092,199 A | 7/2000 | Dutcher et al. | |
| 6,128,655 A | 10/2000 | Fields et al. | |
| 6,182,131 B1 | 1/2001 | Dean et al. | |

(Continued)

FOREIGN PATENT DOCUMENTS

| | | |
|---|---|---|
| EP | 0838774 | 4/1998 |
| EP | 0869652 | 10/1998 |
| EP | 0907120 | 4/1999 |
| NL | 1006667 C | 1/1999 |

OTHER PUBLICATIONS

Chapman et al. (D. Brent Chapman ad Elizabeth D. Zwicky, "Building Internet Firewalls", O'Reilly & Associates, Inc., ISBN: 1565921240, Sep. 1995) p. 19.*

(Continued)

*Primary Examiner* — Kambiz Zand
*Assistant Examiner* — Peter Poltorak
(74) *Attorney, Agent, or Firm* — Volpe and Koenig, PC

(57) ABSTRACT

A system for the secure transmission of messages that may be included with existing automated message handling software applications. The secure transmission system includes a user interface tool that appears with the user interface of the conventional automated message handling system. A digital key generator and encryption engine is responsive to the user interface tool. Upon creating an addressed message using the conventional user interface of the automated message handling application, the user can select the user interface tool to activate the digital key generator and encryption engine that in turn generates a secure file containing the message content and address. The system further includes a message generator that generates a message to a secure message-handling server. The secure message includes the secure file and the digital signature of the secure file. The secure email, when received by the secure message-handling server, is prepared for secure delivery to the addressee of the message.

6 Claims, 17 Drawing Sheets

U.S. PATENT DOCUMENTS

| | | | |
|---|---|---|---|
| 6,192,407 B1 | 2/2001 | Smith et al. | |
| 6,275,850 B1 | 8/2001 | Beyda et al. | |
| 6,308,222 B1 | 10/2001 | Krueger et al. | |
| 6,356,937 B1* | 3/2002 | Montville et al. | 709/206 |
| 6,389,472 B1 | 5/2002 | Hughes et al. | |
| 6,442,571 B1 | 8/2002 | Haff et al. | |
| 6,463,464 B1 | 10/2002 | Lazaridis et al. | |
| 6,487,599 B1 | 11/2002 | Smith et al. | |
| 6,490,620 B1 | 12/2002 | Ditmer et al. | |
| 6,609,196 B1* | 8/2003 | Dickinson et al. | 713/154 |
| 6,618,747 B1* | 9/2003 | Flynn et al. | 709/206 |
| 6,625,642 B1* | 9/2003 | Naylor et al. | 709/206 |
| 6,684,248 B1 | 1/2004 | Janacek et al. | |
| 6,732,101 B1* | 5/2004 | Cook | 707/10 |
| 7,055,091 B1* | 5/2006 | Williams | 715/500 |
| 2001/0037315 A1* | 11/2001 | Saliba et al. | 705/70 |
| 2003/0046533 A1* | 3/2003 | Olkin et al. | 713/152 |

OTHER PUBLICATIONS

Camarda ("Using Microsoft Word 2000, Special Edition", QUE Corporation, ISBN 0789718529, May 1999) p. 196-204.*

Pfleeger (Charles P. Pfleeger, "Security in computing", 2nd edition, 1996, ISBN: 0133374866), p. 426-429.*

Paul Robichaux, "Managing Exchange Server", ISBN: 156592-545-9, Jul. 1999,140-141 and 270.*

Shinder (Thomas Shinder, Publishing Exchange 200 Outlook Web Access with ISA Server Update Dec. 12, 2002, Apr. 2001).*

Wikipedia (Hotmail, http://en.wikipedia.org/wiki/Hotmail, Oct. 2008).*

Casey, T.; Roe, M.; Tuck, B.; Wilbur, S., "Secure automated document delivery," Computer Security Applications Conference, Fifth Annual, Dec. 4-8, 1989.

* cited by examiner

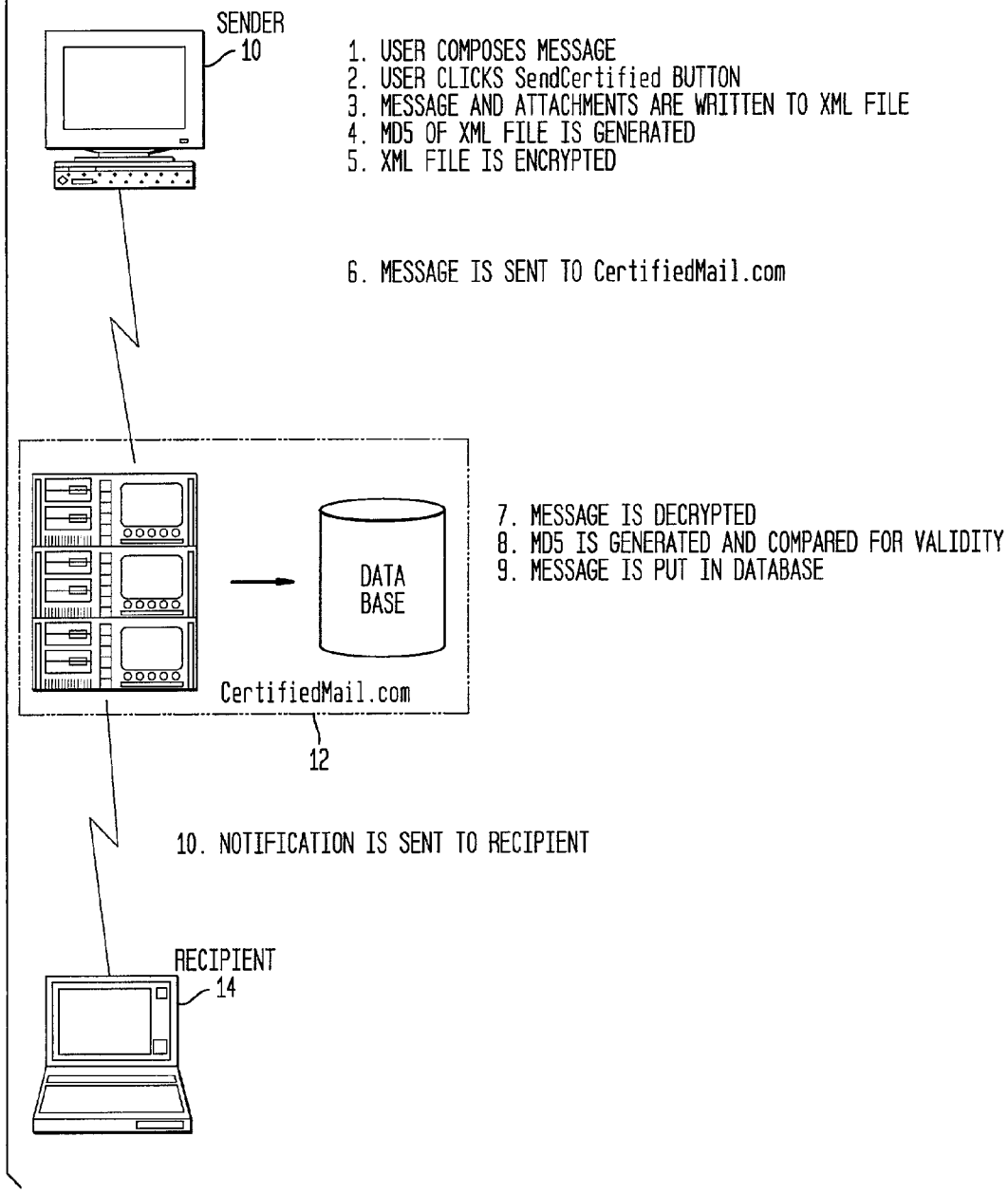

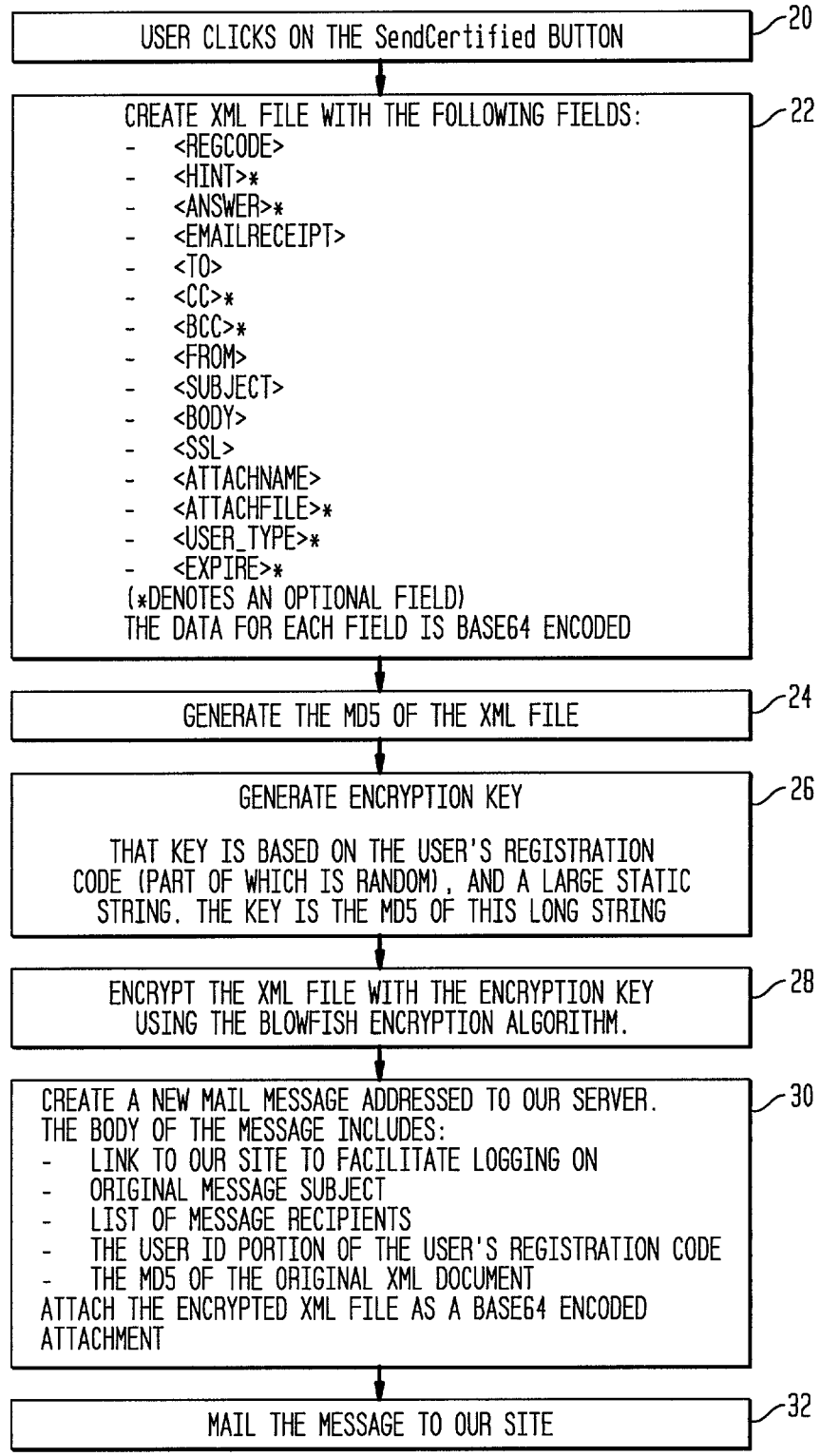

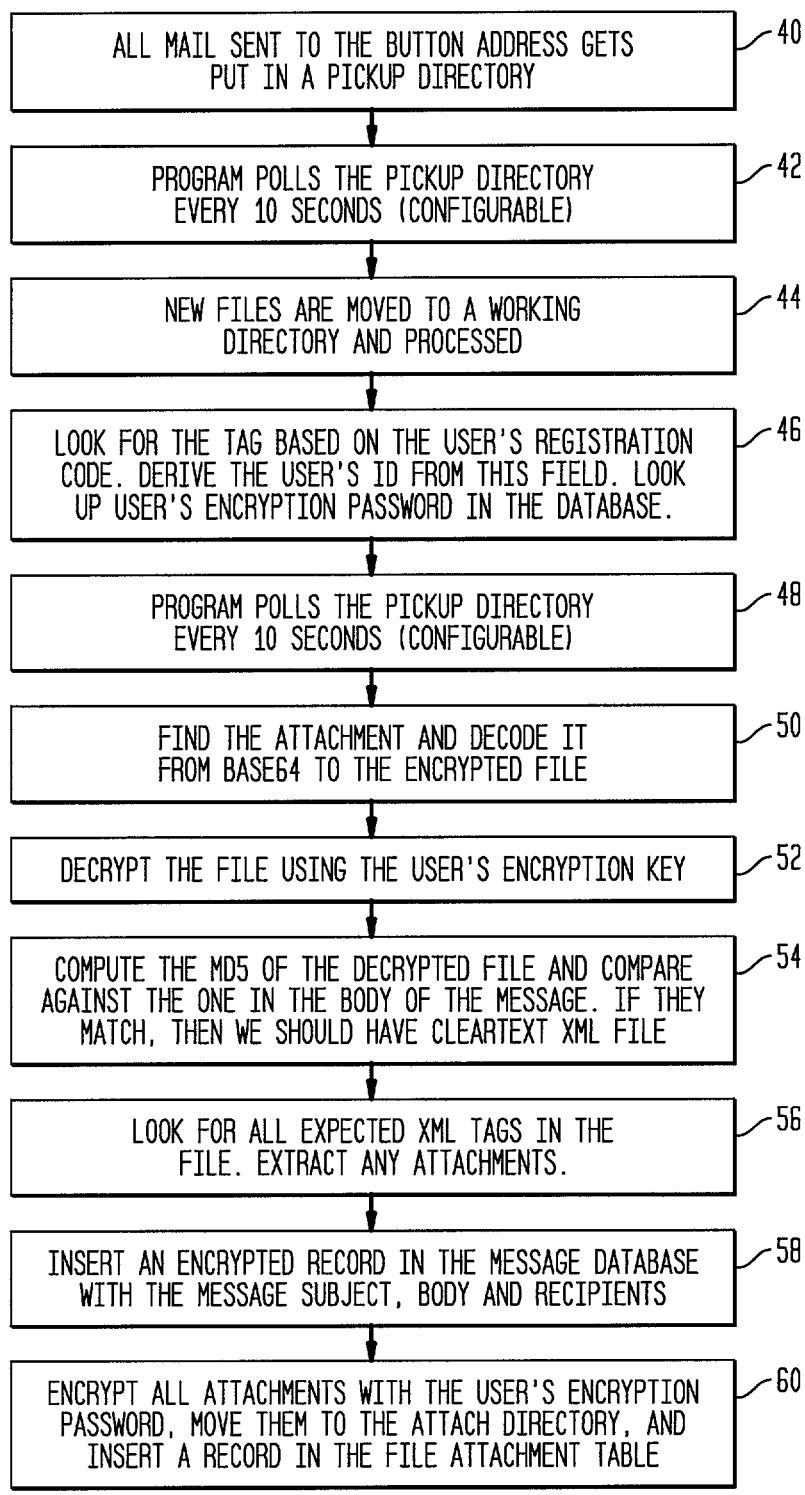

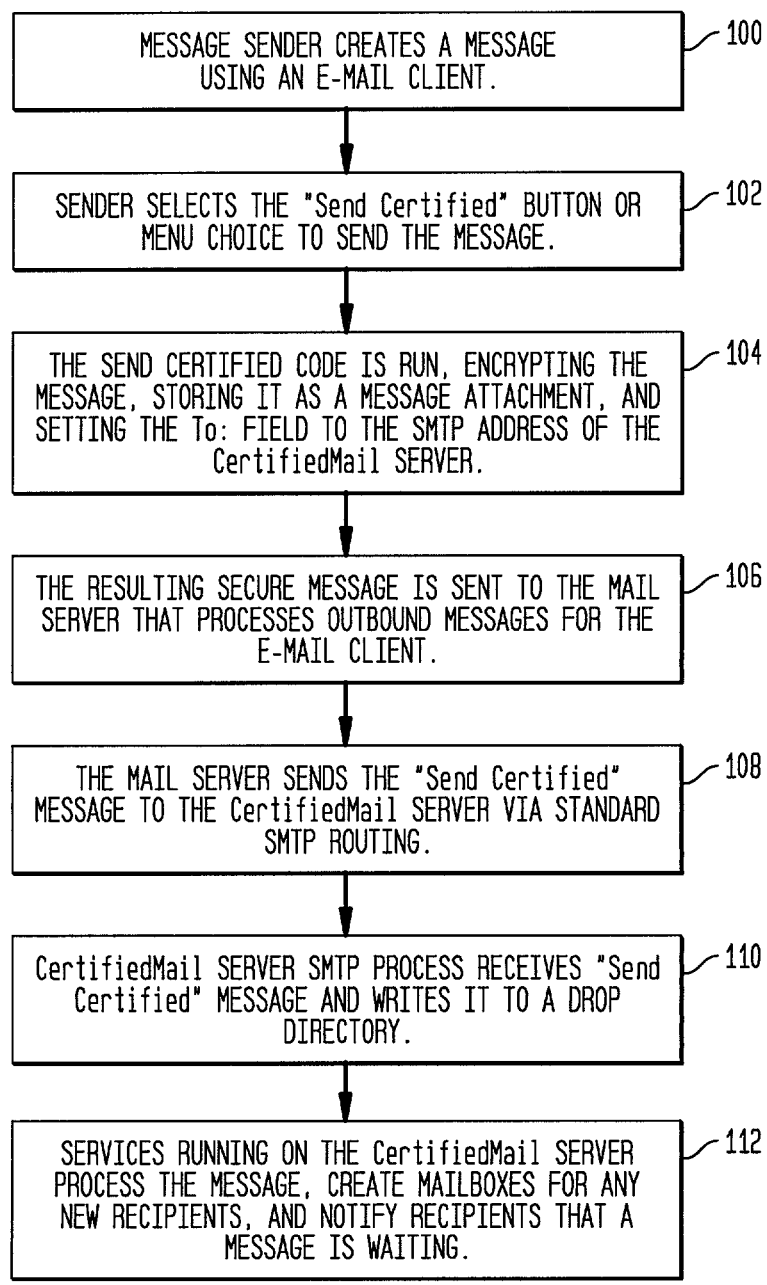

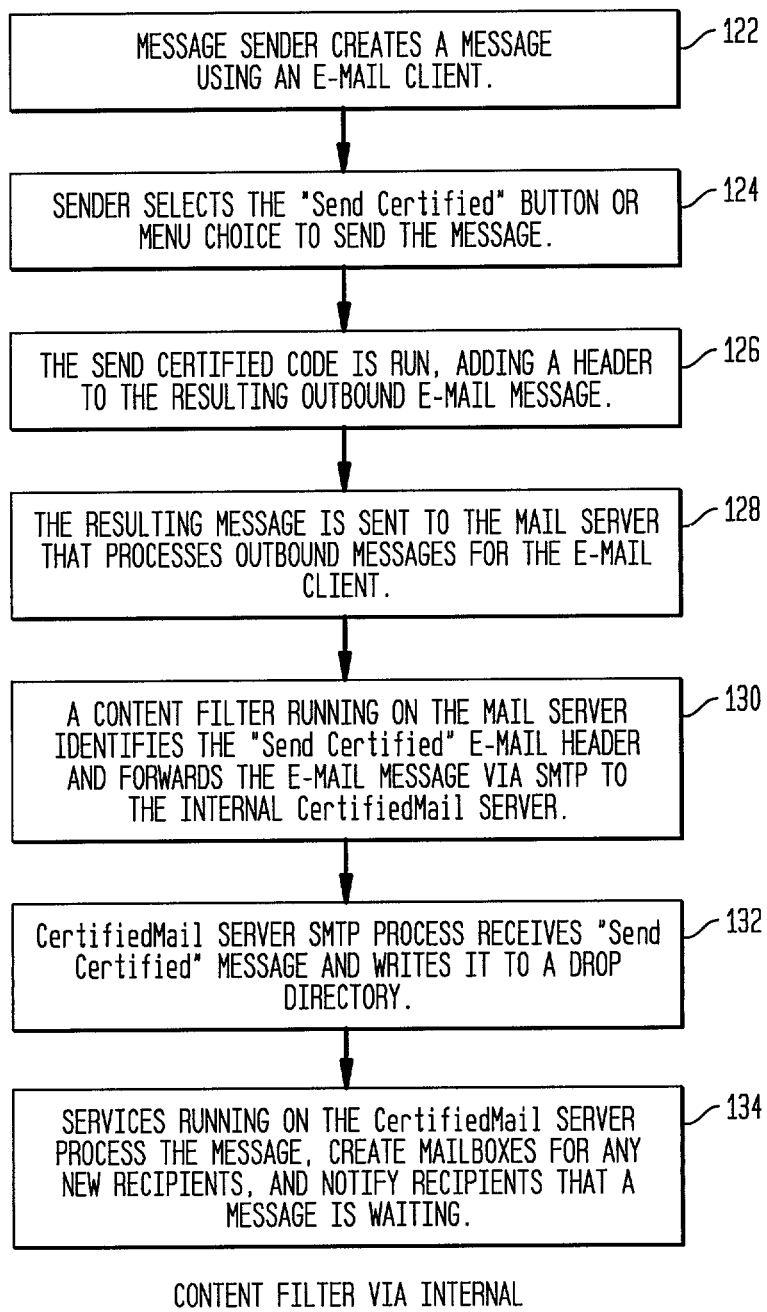

"Send Certified" PROCESS
CONTENT FILTER AND EXTERNAL CertifiedMail SERVER

CONTENT FILTER VIA INTERNET

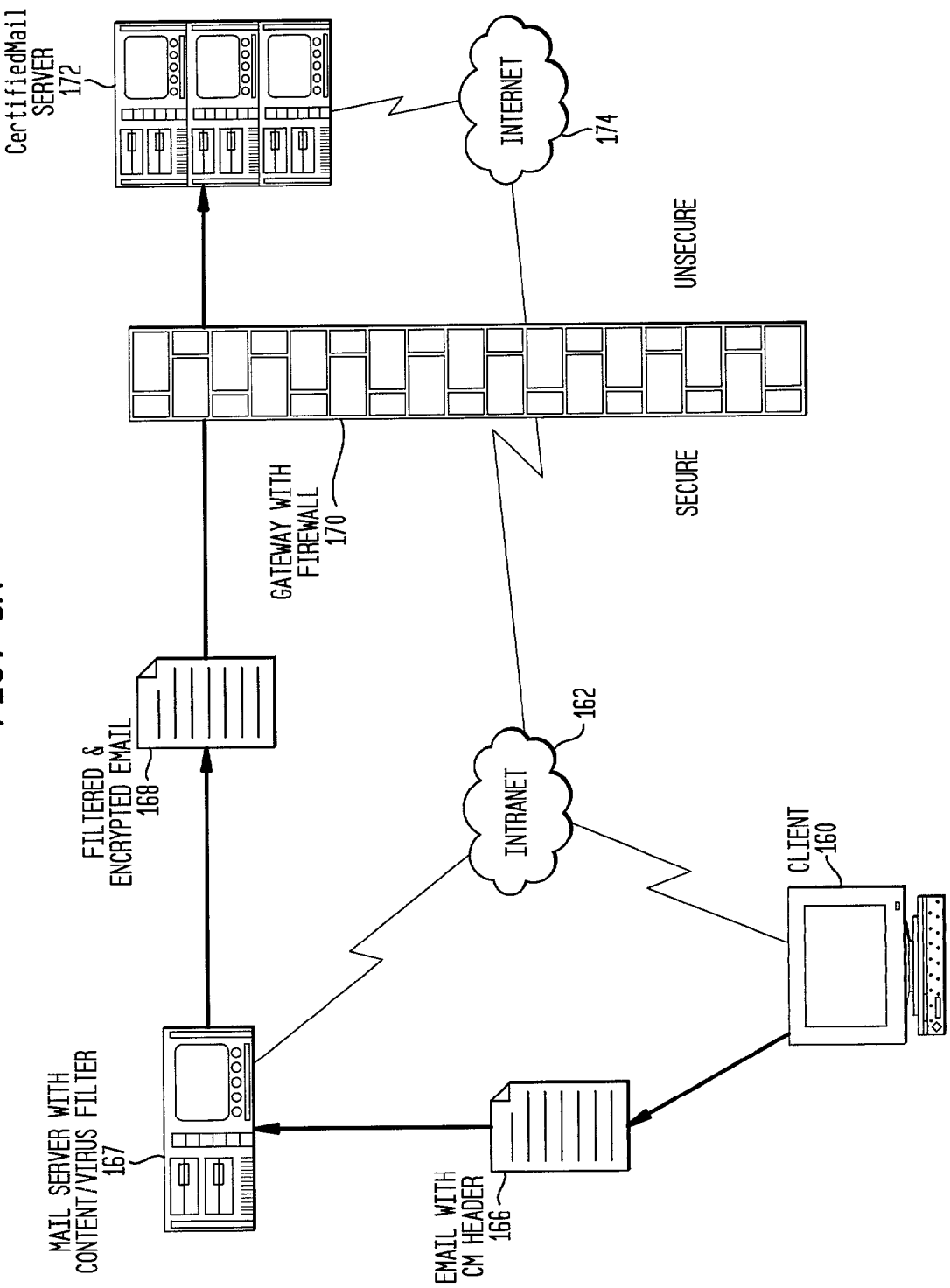

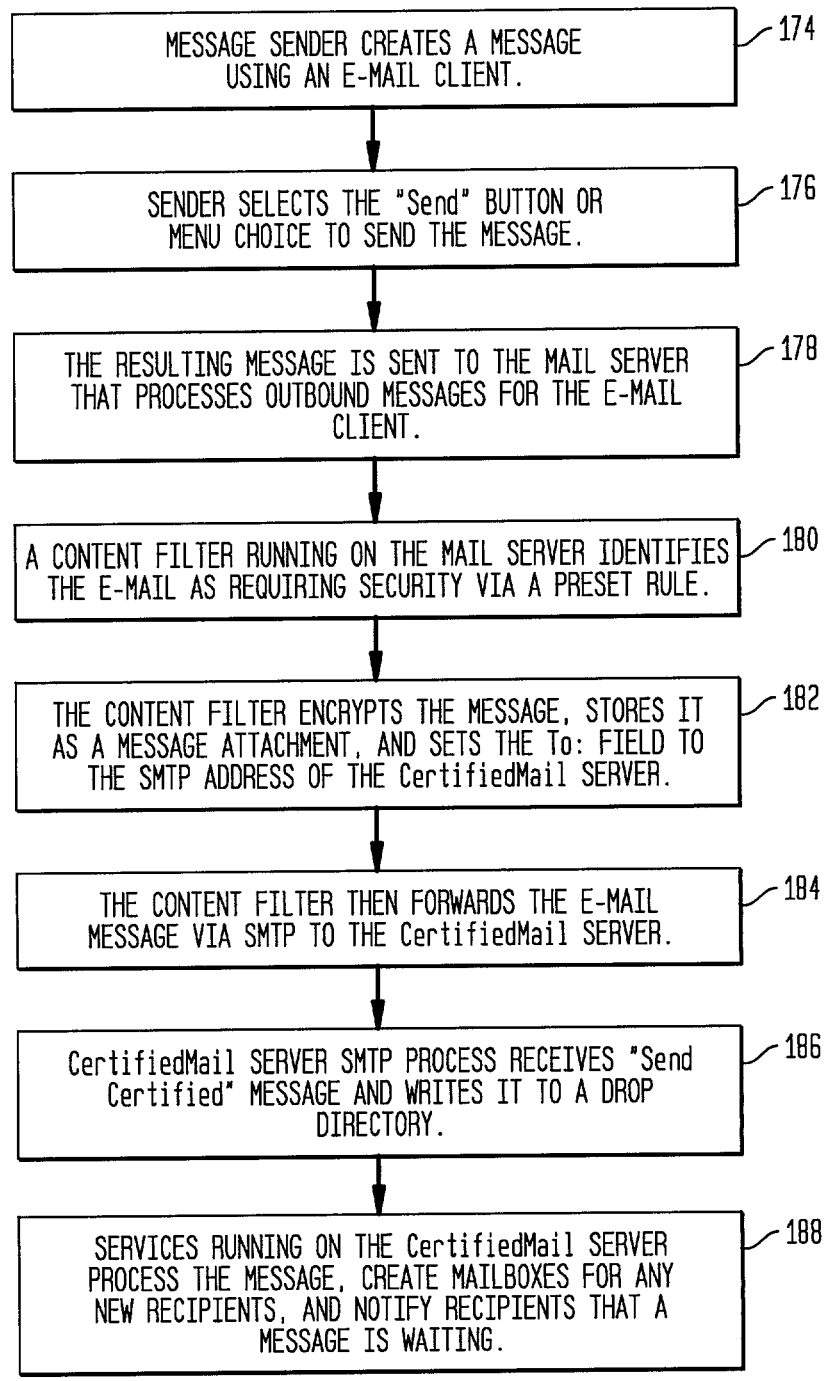

CONTROLLED MESSAGE DISTRIBUTION

CROSS-REFERENCE(S) TO RELATED APPLICATION(S)

This application claims the benefit of U.S. Provisional Application Ser. No. 60/214,934 filed on Jun. 29, 2000 which is incorporated herein by reference.

FIELD OF THE INVENTION

The present invention relates to automated message handling systems and more particularly to secure automated message handling systems.

SUMMARY OF THE INVENTION

The present invention provides a system for the secure transmission of messages that may be included with existing automated message handling software applications. The secure transmission tool includes a user interface tool that appears with the user interface of the conventional automated message handling system. A digital key generator and encryption engine is responsive to the user interface tool. Upon creating an addressed message using the conventional user interface of the automated message handling application, the user can select the user interface tool to activate the digital key generator and encryption engine that in turn generates a secure file containing the message content and address. The system further includes a message generator that generates a message to a secure message-handling server. The secure message includes the secure file and the digital signature of the secure file.

The secure email, when received by the secure message-handling server, is prepared for secure delivery to the addressee of the message.

BRIEF DESCRIPTION OF THE DRAWINGS

FIG. 1 is a functional block diagram of a secure message handling system of the present invention;

FIG. 2 is a flowchart of a secure message-handling tool of the present invention;

FIG. 3 is a flowchart of a secure message collection tool for use on a secure message-handling server;

FIGS. 7 and 7A are, respectively, a flow chart and a functional block diagram of an embodiment of the present invention;

FIGS. 8 and 8A are, respectively, a flow chart and a functional block diagram of a further embodiment of the present invention;

FIGS. 9 and 9A are, respectively, a flow chart and a functional block diagram of a still further embodiment of the present invention; and FIGS. 10 and 10A are, respectively, a flow chart and a functional block diagram of a yet further embodiment of the present invention.

DETAILED DESCRIPTION OF VARIOUS ILLUSTRATIVE EMBODIMENTS

Figure 4A:
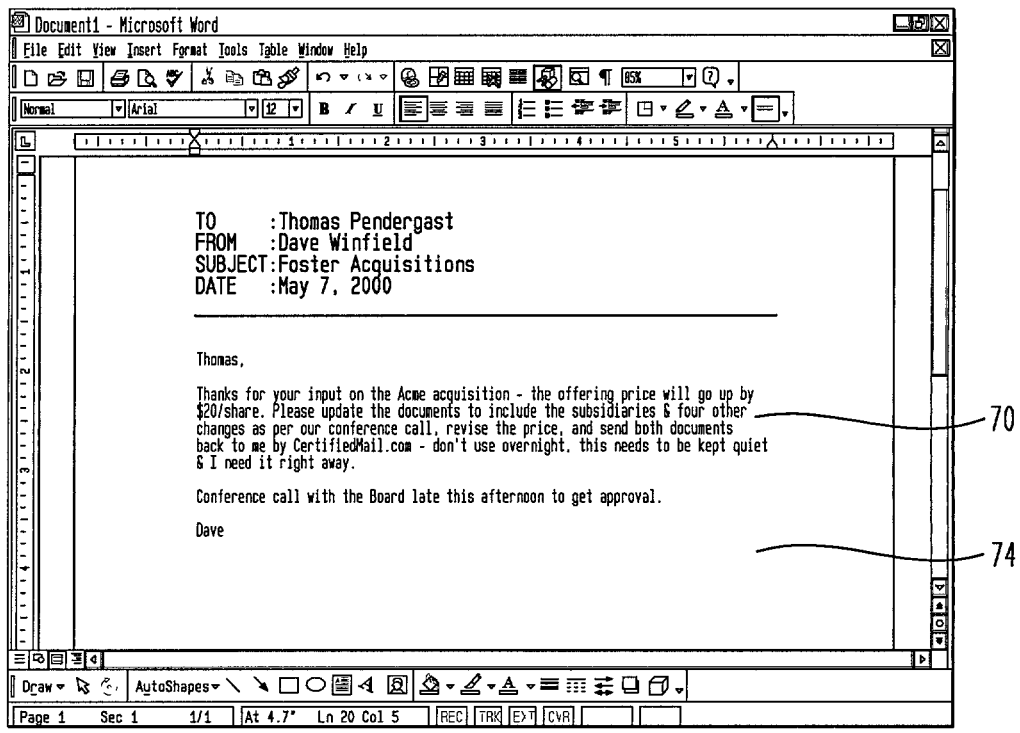
FIGS. 4A to 4C are front views of personal computer screens using the present invention.

Vendors, universities and government agencies attempted to provide a system for controlled message distribution in various ways, with the creation of such security standards as Secure Socket Layer (SSL) and S/MIME. Both of these standards depend on digital certificates, which are at the core of Public/Private Key (PKI) encryption. SSL is often used to securely exchange data between a web browser and an Internet web server. It is a widespread standard since it fills a very clear security hole, and just as importantly, is very easy to implement and use. S/MIME is also a widespread standard, used mainly to secure email messages, but its dependence on unique digital certificates for both the sender and recipient has severely limited its acceptance by email users. With S/MIME, email senders and email recipients must obtain digital certificates and install them in their email client software. Then, the email sender must obtain copies of the Public keys of all of their message recipients, and digitally sign their messages with their Private key and each recipient's Public key. While this process produces a secure message exchange between the sender and their recipients, its burden on the sender and recipient has made it too complex for widespread acceptance.

To gain widespread acceptance, secure message delivery over the Internet must be made as technically unchallenging as possible, while still providing uncompromising data protection. Additional value can be added if the sender is notified when their recipients have opened their message. Further value can be added if the receipt notification works in all cases, regardless of the recipient's email software (e.g. email client, web-based email, personal digital assistant). The invention is integrated with such a "certified" message delivery system, and provides a way for message recipients to access their account, open their secure electronic mailbox, and quickly access one or more received messages. Upon opening their message, the system notifies the sender that the recipient has opened their message.

In traditional e-mail systems, a user must initiate the account creation process, usually by requesting an account or joining an organization. This is often accomplished by the user visiting a website to fill out a registration form, or by an administrator creating an email address for one or more known users on a system managed by that administrator. Registered users are then assigned a unique email address on the system. In such systems, the user can then send and receive email messages.

With reference to FIG. 1 for purposes of illustration, a secure message-handling tool is provided that can be displayed with the user interface of an existing message handling application on a personal computer 10. A message handling application of the type suitable for this purpose is the e-mail client programs, distributed under the names Outlook and Outlook Express by Microsoft Corporation of Redmond, Wash. It should be noted, however, that while the present invention is illustrated and described with particular reference to Outlook and Outlook Express, it is equally adapted to be used with other e-mail client programs, such as Lotus Notes, Eudora and the like. It will be appreciated by those skilled in the art that the subsequent description using Outlook would enable one to make and use of the present invention with any e-mail client program. The secure message-handling tool is installed on a personal computer using one of the Outlook family of applications and provides an secure send button on the user interface of the message handling application. When a message is ready to be sent and has been completed with a message body and address, the user may select the secure message-handling tool rather than the send button included with the message handling application. The message is sent to a secure message-handling server 12. The intended recipient 14 can then access the message from the server.

With reference to FIG. 2, selecting the secure message-handling tool activates a program at step 20. The program uses the completed message file to create an XML file that contains the pertinent of message fields at step 22. A data validation set-up is initiated at step 24, and by using a hashing check validation method, a hashing value is determined. A hashing algorithm of the type suitable for this purpose is the MD5 algorithm created in 1991 by Professor Ronald Rivest. An encryption key is then generated at step 26 based upon the user's registration code. The encryption key is used to encrypt the XML file containing the message information at step 28. An encryption engine of the type suitable for this purpose is the encryption engine known as Blowfish. The encrypted file is saved and a new message is created that is addressed to a secure message-handling server at step 30. The message includes the hashing value, a list of message recipients, an id corresponding to the sender, a link for the sender to view the file on the secure server and the encrypted file as an attachment. The completed message with the encrypted file is then sent to the secure message-handling server at step 32.

With reference to FIG. 3, the received message is stored in a pickup directory at step 40 upon being received by the secure message-handling server. The server scans the pickup directory during predetermined intervals at step 42. Upon detecting a new file it is moved to a working directory for processing at step 44. The sender's id is recognized and a decryption password is loaded at step 46. Another scan of the pickup directory may occur during processing as represented at step 48. The file is withdrawn from the email message at step 50. The file is then decrypted at step 52. The hashing function is executed on the decrypted file to obtain a hashing value and a hashing check occurs at step 54. File attachments from the decrypted file are withdrawn at step 56. The message with attachments is then moved to a portion of the server as an encrypted record designated for viewing messages at step 58. The attachments that are withdrawn are encrypted on the server and linked to the message that is available for viewing at step 60.

A button interface is installed into both the toolbar and menubar of Outlook and Outlook Express by using the standard Windows API calls. Two classes are created that extend the normal Outlook's classes and Outlook will call the methods when it needs to interface with the button. The public class declarations are:

```
class MyExchExt    :    public IExchExt
{
public:
    MyExch Ext ( ) ;
    STDMETHODIMP QueryInterface (REFIID riid, LPVOID *ppyObj) ;
    STDMETHODIMP_(ULONG) AddRef ( ) ;
    STDMETHODIMP_(ULONG) Release ( ) ;
    STDMETHODIMP Install (LPEXCHEXTCALLBACK pmecb, ULONG
mecontext, ULONG ulFlags);
};
class MyExchExdtCommands   :    public IexchExtCommands
{
public:
    MyExchExtCommands ( ) ;
    STDMETHODIMP QueryInterface (REFIID riid, LPVOID *ppvObj)
    STDMETHODIMP_(ULONG) AddRef ( ) ;
    STDMETHODIMP_(ULONG) Release ( ) ;
    STDMETHODIMP InstallComrnands  (LPEXCHEXTCALLBACK pmecb,
                                    HWND hwnd, HMENU hmenu
                                    UINT FAR * cmdidBase,
                                    LPTBENTRY lptbeArray, UINT ctbe,
                                    ULONG ulFlags) ;
    STDMETHODIMP DoCommand (LPEXCHEXTCALLBACK pmecb), UINT
                                    mni) ;
    STDMETHODIMP (VOID) InitMenu, (LPEFXCHEXTCALLBACK pmecb):
    STDMETHODIMP Help (LPEXCHEXTCALLBACK pmecb, UINT mni) ;
    STDMETHODIMP QueryHelpText (UINT mni, ULONG ulFlags, LPTSTR sz,
                                    UINT cch);
    STDMETHODIMP QueryButtonInfo (ULONG tbid, UINT itbb, LPTBBUTTON
                                    ptbb, LPSTR lpsz, UINT cch, ULONG ulFlags
    STDMETHODIMP ResetToolbar (ULONG tbid, ULONG ulFlags);
    VOID SetContgext (ULONG eecontext) ;
    UINT GetCmdID ( ) ;
```

Thus, to insert the toolbar button: SendMessage with the TB_ADDBITMAP option. To insert the menu: InsertMenu. The Outlook program will start running the code through these interfaces when the user clicks on to button or the menu item.

The XML DTD is:
```
<?xml version="1.0" encoding="UTF-8"?>
<!-- CertifiedMail.com, Inc. - SendCertified XML DTD -->
<!ELEMENT SendCertifiedMessage (RegCode, Hint?, Answer?,
EmailReceipt, To, CC?, BCC?, From, Subject, Body, SSL,
Attachment*, User_Type, Expire)>
<!ELEMENT RegCode (#PCDATA)>
<!ELEMENT Hint (#PCDATA)>
<!ELEMENT Answer (#PCDATA)>
<!ELEMENT EmailReceipt (#PCDATA)>
<!ELEMENT To (EmailAddress+)>
<!ELEMENT CC (EmailAddress+)>
<!ELEMENT BCC (EmailAddress+)>
<!ELEMENT From (EmailAddress)>
<!ELEMENT Subject (#PCDATA)>
<!ELEMENT Body (#PCDATA)>
<!ELEMENT SSL (#PCDATA)>
<!ELEMENT Attachment (FileName, FileData)>
```

-continued

```
<!ELEMENT AttachFile (#PCDATA)>
<!ELEMENT User_Type (#PCDATA)>
<!ELEMENT Expire (#PCDATA)>
<!ELEMENT EmailAddress (#PCDATA)>
<!ELEMENT FileName (#PCDATA)>
<!ELEMENT FileData (#PCDATA)>
```
Reference code for the MD5 hashing algorithm can be found at:
ftp://ftp.funet.fi/pub/crypt/hash/mds/md5/md5sum.tar.gz; and
Reference code for the Blowfish encryption algorithm can be found at:
Blowfish - http://www.counterpane.com/blowfish.html.

The subject invention is an add-on that seamlessly integrates with MS Outlook 97/98/2000, Express and MS Exchange Client and is a 180 KB file that the user can download from a website to install into a computer. The program creates a button on Outlook's toolbar, allowing users who use Outlook to send and receive e-mails to now send secure messages and attachments at the click of the mouse. Thus the present invention can be used without requiring additional training of the user. The system includes ease of installation and use, additional control over messages, confidence in sending e-mails and attachments and convenience by creating secure messages directly from an e-mail application such as, Outlook, or other programs. For example, messages can be sent directly from MS Word. Basically, the present system secures the messages and is a self-contained tool that automatically encrypts and digitally fingerprints the message and attachment without any user intervention. There is no need to install public or private keys and no certificates of any kind are required. The tool in essence places the electronic message into the electronic equivalent of a secure envelope that is then addressed to a secure mail server in lieu the mail server normally associated with the recipient. The secure envelope is thus the encryption of the message which is then sent as an attachment to the secure mail server.

It will be further understood by those skilled in the art that the secure e-mail software of the present invention may be used with automated message generation applications. Thus, for example, an automated stock trading application could generate secure messages to clients to notify them of their stock trading status.

Furthermore, although the present invention has been described for use on a personal computer running an e-mail application. Those skilled in the art will understand that a wireless device may be substituted for the personal computer in any of the embodiments described herein. Wireless devices may include, but are not limited to, e-mail enabled pagers and cell phones, PDAs and other wireless e-mail systems.

The present system provides user friendly secure message transmission. In addition to the protection of encryption and digital fingerprinting, a further layer of protection includes the use of passwords where the recipient can only view the message after entering the proper password.

The recipient does not need to install any special software to receive the secure message and the system works by sending notification to any e-mail client whether it is web-based or not. The present system also supports the feature that return receipts can be received by the sender to indicate the day, date, time and IP address of the recipient that has read the message and, again, is applicable to any e-mail system.

Figure 4B:
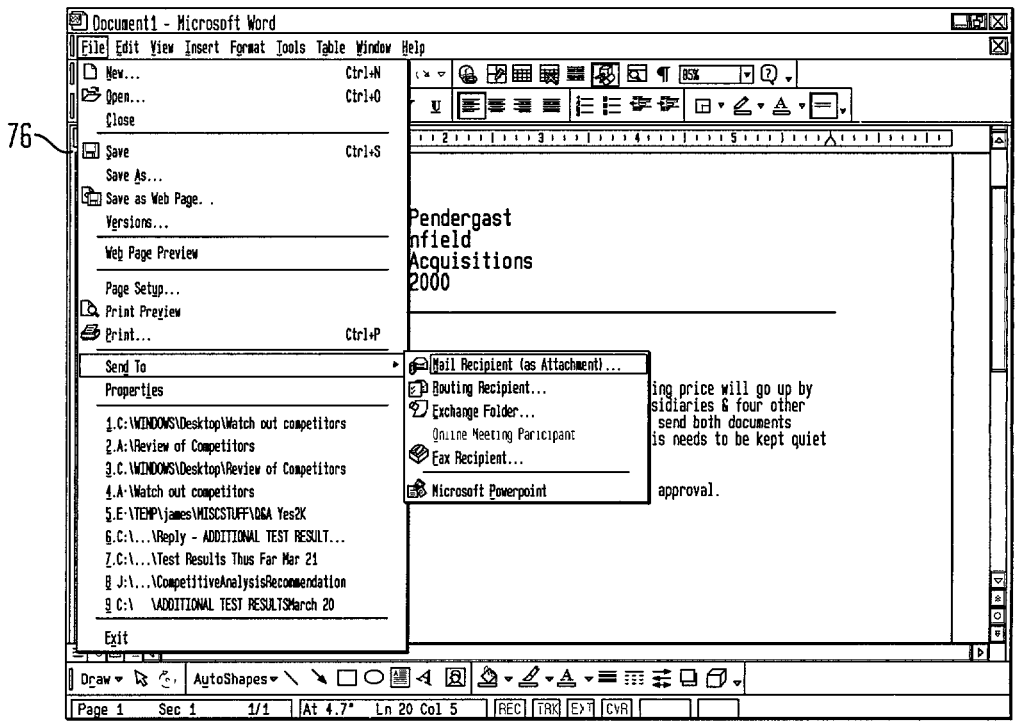
Figure 4C:
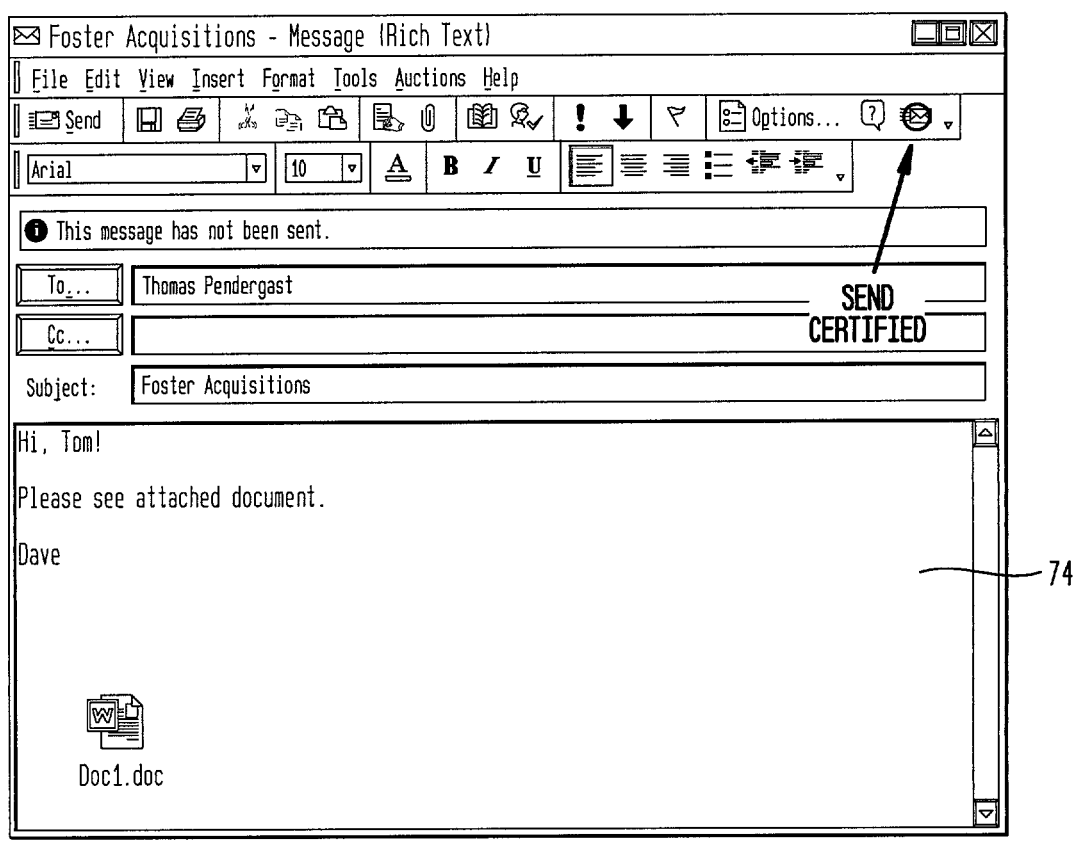

Turning to FIGS. 4A-4C, there is shown typical views of the present secure message handling system to send a message directly from MS Word, however, the same technique is used to send from any other application, such as Excel, PowerPoint, Adobe Acrobat and the like tied into the e-mail client program. In FIG. 4A, it can be seen that the document 70 can be created from MS Word on the screen 74 in the normal use of that program. After the document has been created and completed, in FIG. 4B, the user simply brings down the menu 76 and clicks on File>Send To >Mail Recipient (as Attachment). If Adobe Acrobat is used, the user would need to click File>Send Mail. That action brings up the Outlook mail client, with the screen 74 of FIG. 4C, to allow the user to create the e-mail message with the Word document already attached. To send the message, the user then simply clicks on Send Certified and the secure message has been sent.

Figure 5A:
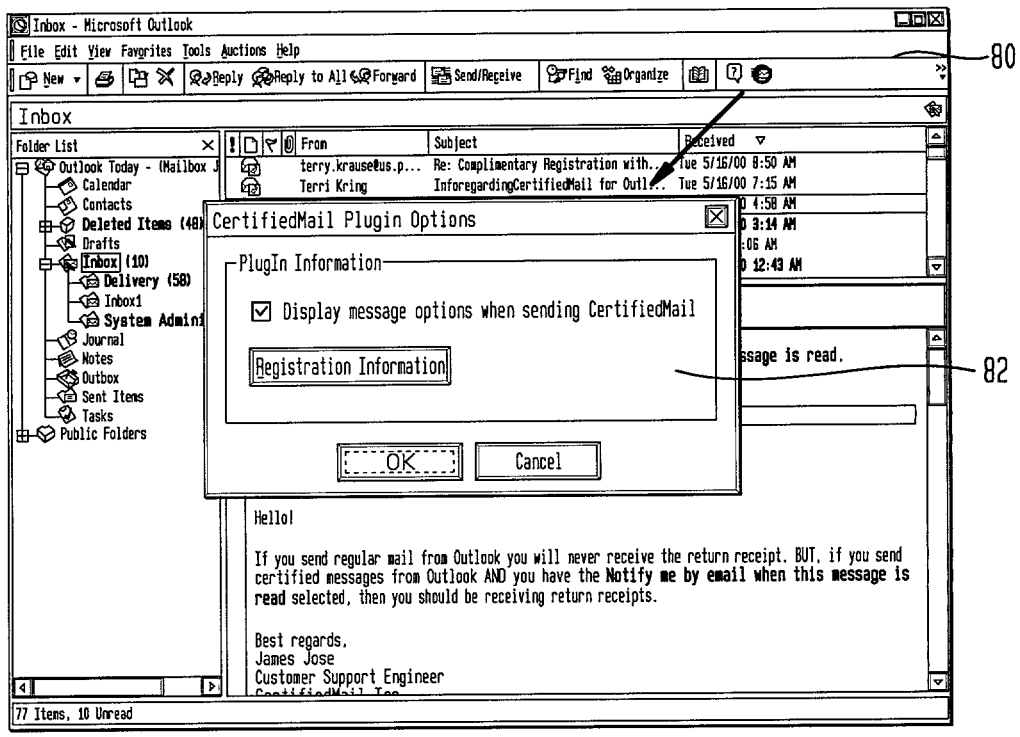
FIGS. 5A to 5D are front views of personal computer screens using the present invention.
Figure 5B:
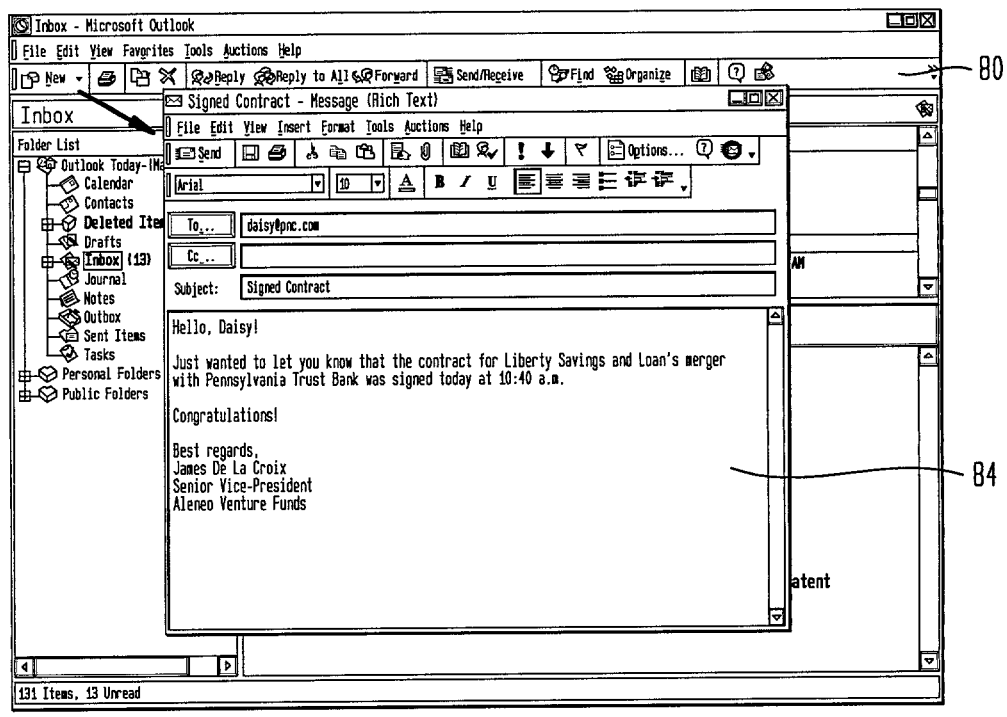
Figure 5C:
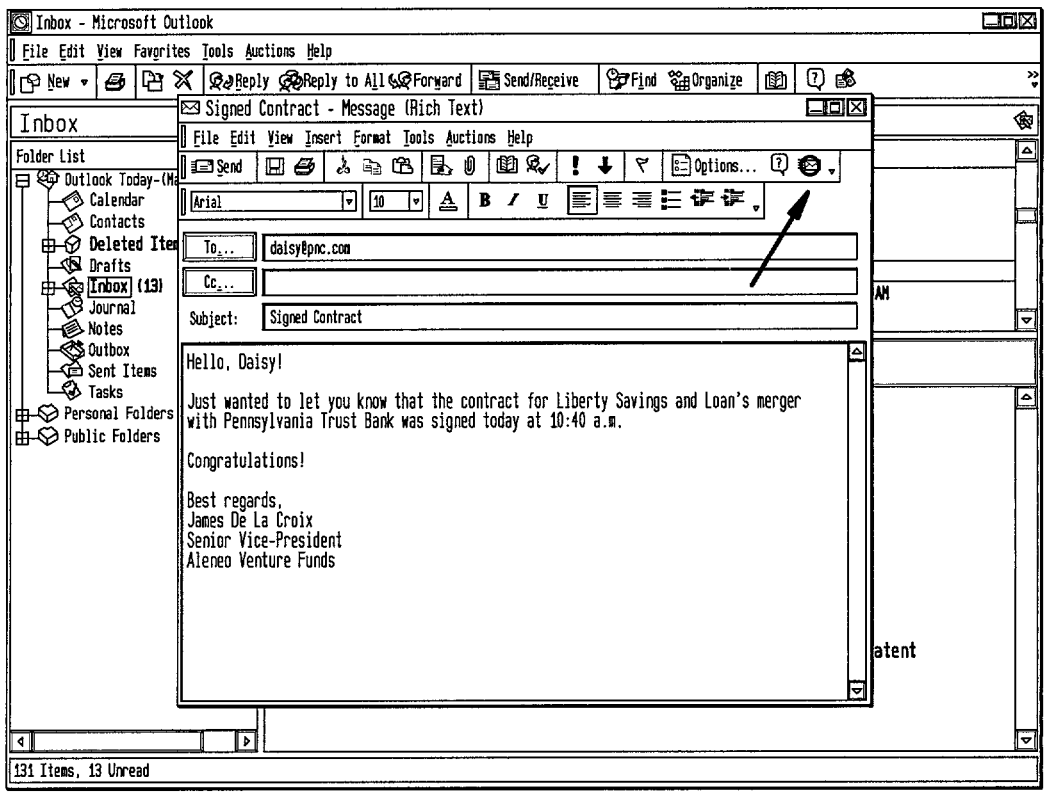
Figure 5D:
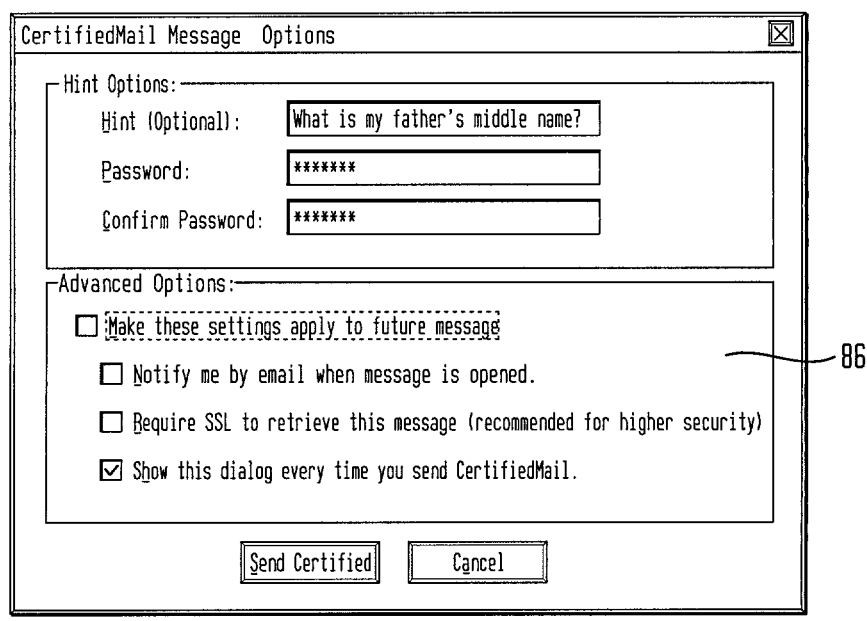

In FIGS. 5A-5D, there are shown the various screens with Outlook that includes the feature where an additional layer of security is added to protect messages and their attachments. With the FIGS. 5A-5D embodiment, a password function is used such that the recipient can only get to read the secure e-mail and acquire the attached files by entering the proper pass code. Thus, in FIG. 5A, the user clicks the Send Certified Options located on the toolbar 80 of the Outlook system to bring down the box 82 entitled CertifiedMail Plugin Options and verify that the "Display message options when sending CertifiedMail" has been selected. If not, the box is selected and the OK is clicked. In FIG. 5B, therefore, the New is clicked on the toolbar 80 and the new message is created on the screen 84. Again, when the message has been created and completed, the Send Certified is clicked on the toolbar 80 in FIG. 5C to send the message. At this point, however, as seen in FIG. 5D, a dialog box 86 opens allowing the user to enter any password and hint to protect the message, noting, of course, that the degree of difficulty given to the password will also dictate how easy or hard it is for the recipient to open the message. Upon selection of the password, the user again simply clicks on "Send Certified", and the certified message is sent to the recipient password protected.

Figure 6A:
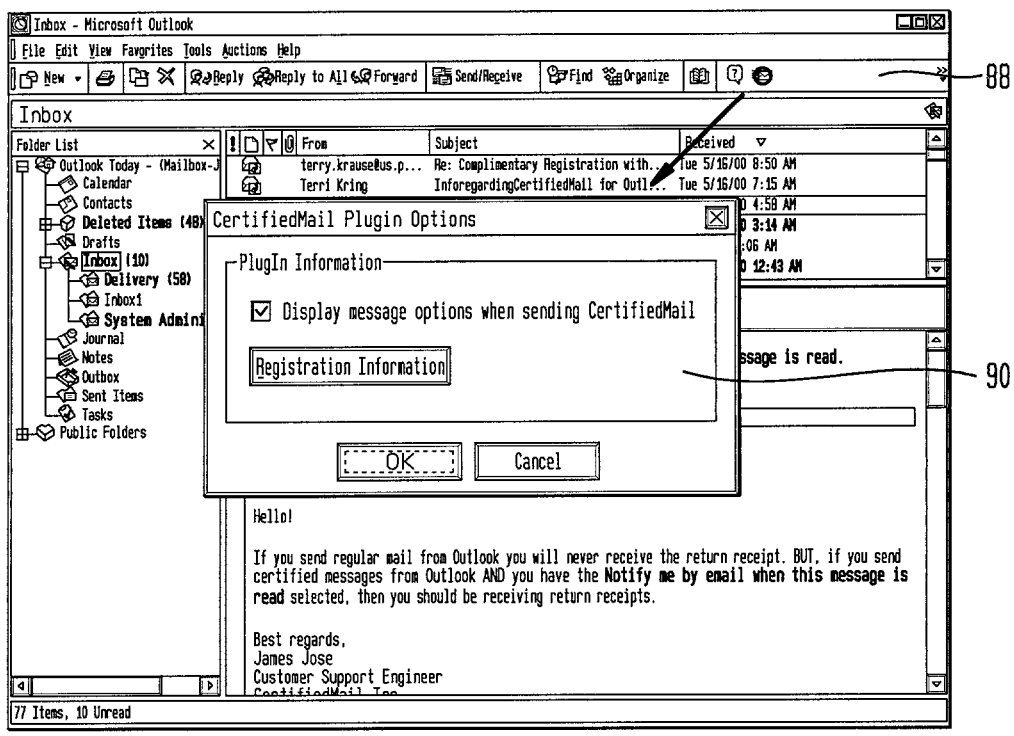
FIGS. 6A-6D are front views of personal computer screens using the present invention.
Figure 6B:
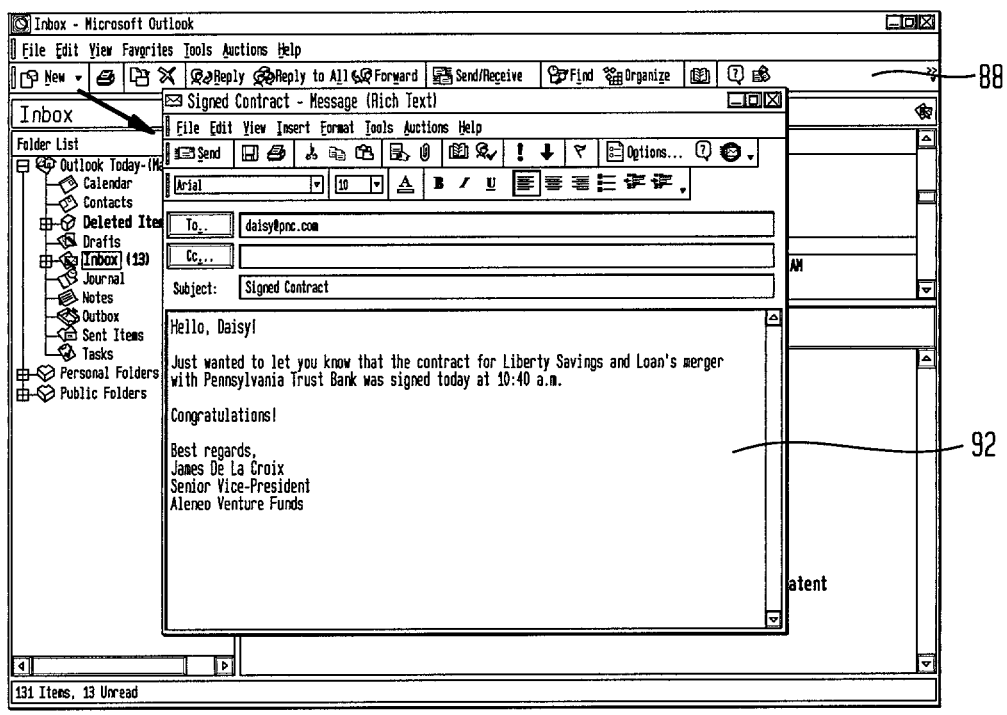
Figure 6C:
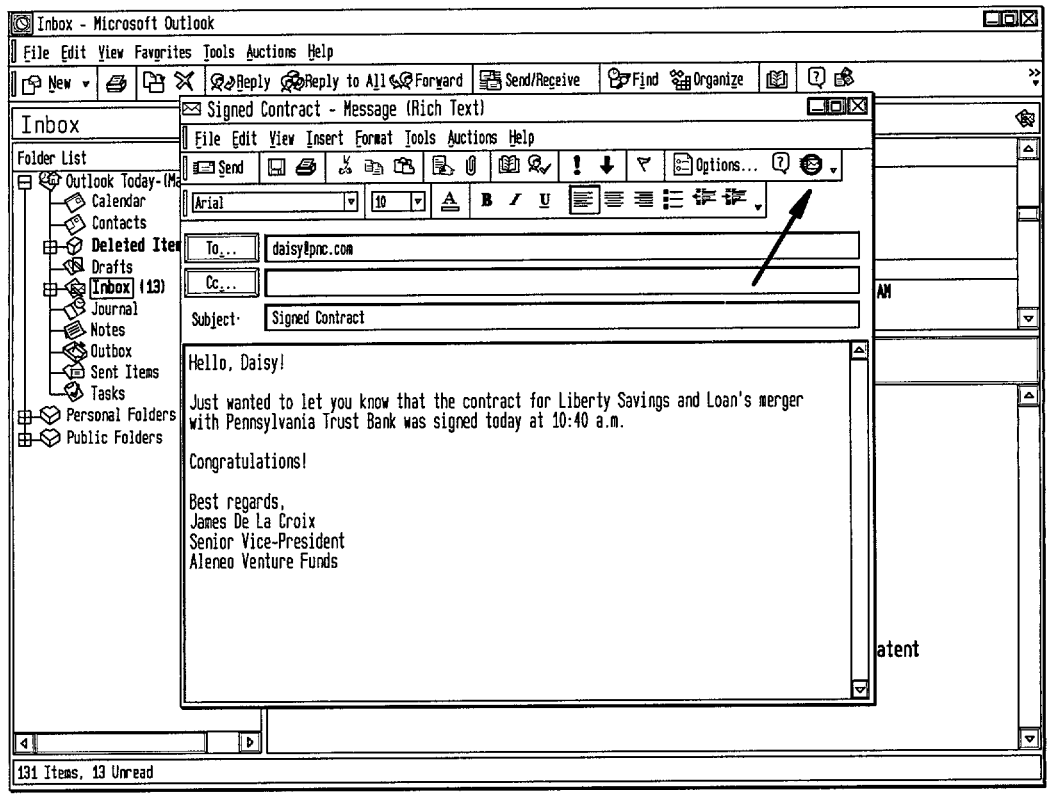
Figure 6D:
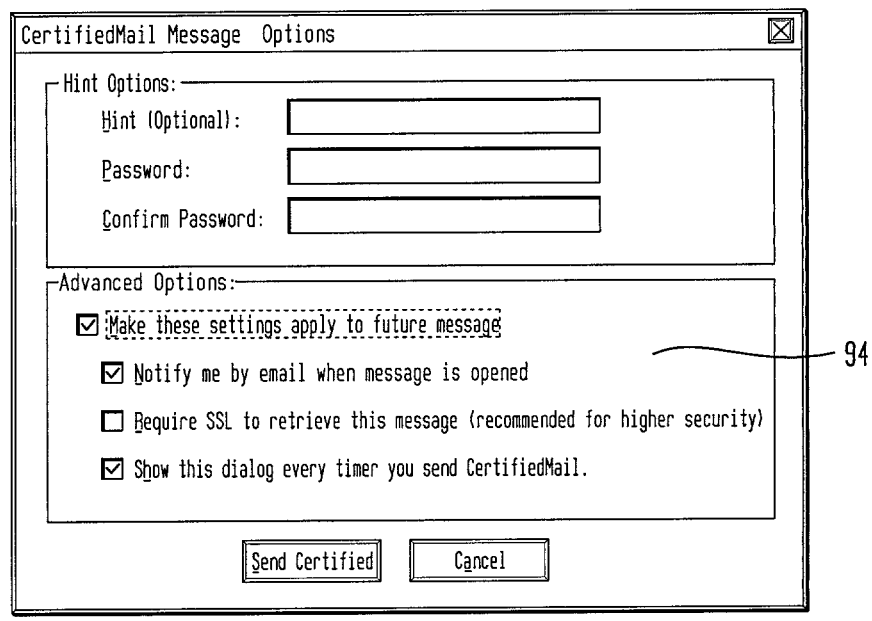

In FIGS. 6A-6D, a further feature of receiving a return receipt is illustrated. With this feature, the sender can be assured that the message was definitely received by the recipient complete with the day, date, and time the message was opened. Again, turning to FIG. 6A, the Send Certified Options is clicked on the toolbar 88 and the message box 90 appears so that the user can verify that the "Display Message Options When Sending CertifiedMail" is selected and, if not, it is selected by the user and the OK clicked. As before, the New is then clicked on the toolbar 88 and, as shown in FIG. 6B, the new message is created on the screen 92. After the message has been created and completed, in FIG. 6C, the user clicks on "Send Certified" and which opens a dialog box 94 on FIG. 6D allowing the user to select "Notify me by email when message is opened" The user thereupon selects "Make these settings apply to future messages" as well and by so selecting these options, the present system automatically generates and e-mails the user receipts for certified messages that are sent.

Figure 7A:
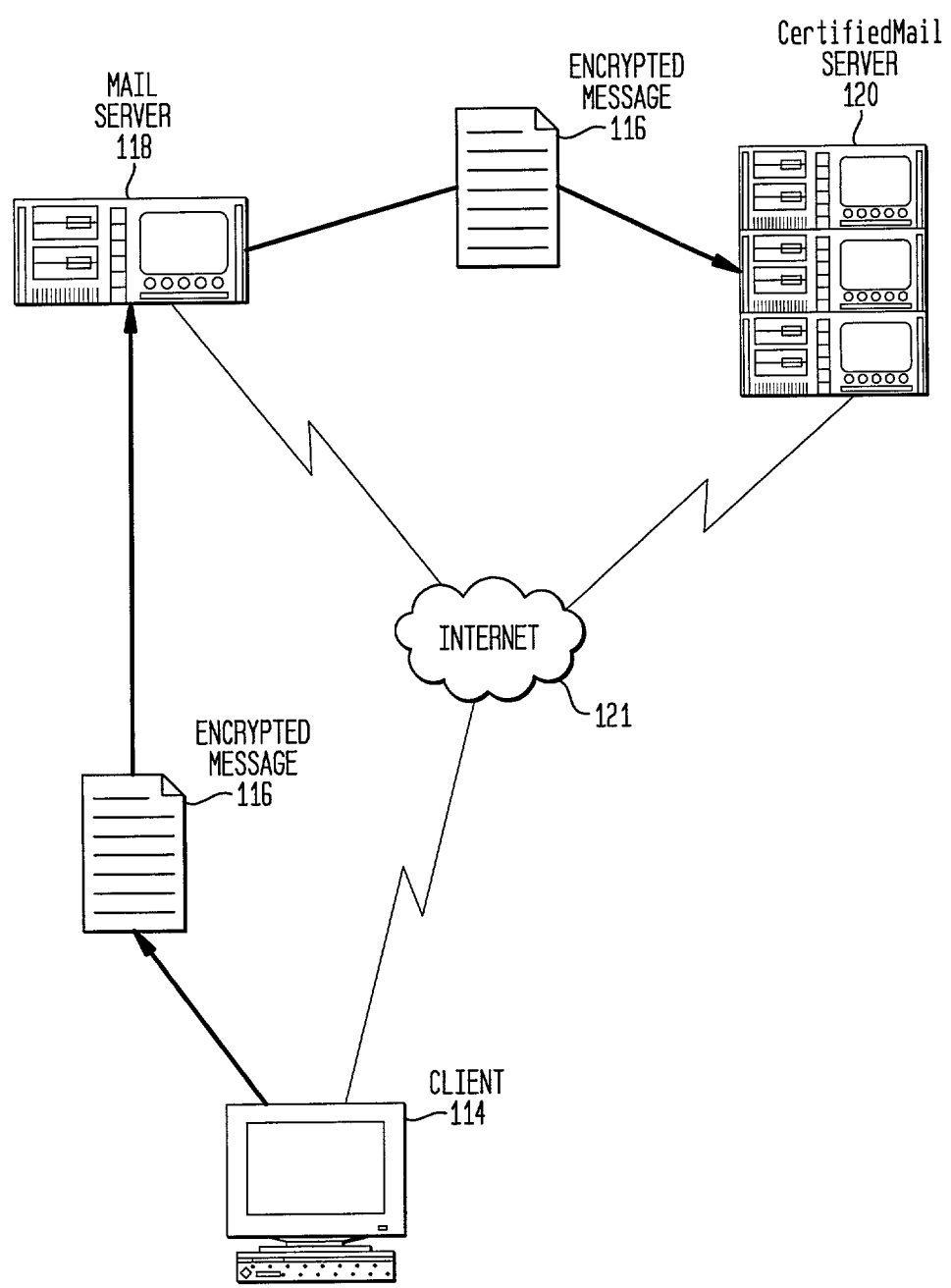

Turning now to FIG. 7, there is shown a flow diagram of an embodiment of the present secure mail system and FIG. 7A is a functional block diagram of the FIG. 7 embodiment. In this embodiment, an internal mail server is used with the system that may interconnect with the users personal computer. Taking FIG. 7, therefore, at step 100, the message sender creates a message using an e-mail client that, as explained, may be one of a variety of clients. The user then activates the "Send Certified" button or menu choice at step 102 at the local personal computer where the software for the present invention has been installed. Thus, at step 104, the "Send Certified" code is run at the personal computer and the message is encrypted and stored as a message attachment. The To: field is set to the SMTP address of the secure mail server. That secure message is then sent, at step 106 to the mail server that processes the outbound messages for the e-mail client. At step 108, the mail server then sends the "Send Certified" message to the secure mail server via a standard SMTP routing where, at step 110, the secured mail server SMTP process receives the "Send Certified" message and writes it to a drop directory. The services running on the secured mail server thereupon, at step 112, processes the message, creates mailboxes for any new recipients and notifies the recipients that a message is waiting.

In FIG. 7A there is a function block diagram of the FIG. 7 embodiment and where the personal computer 114 of the user is employed to create the message and that personal computer 114 also has the necessary software for the secure mail system such that the user can select the "SendCertified" button or menu entry. The message is thereupon encrypted, that encrypted message 116 stored as a message attachment and setting the To: files to the SMTP address of the secure mail server. Thus, the encrypted message 116 is sent to the mail server 118 that normally processes the message for that e-mail system. That secure, encrypted message 116 is then sent on to the secure mail server 120 where the aforedescribed processing takes place as steps 110 and 112 of FIG. 7. The secure mail server 120 can notify the recipient via the Internet 121 that the message has been received and the user retrieves the message in the normal manner with the proper password to have the message decrypted and sent to the recipient. As can be seen in this embodiment, since the message is encrypted at the personal computer 114 initially, the message can be thereafter sent over unsecured communications, such as the Internet 121 and only decrypted when the recipient has been notified and retrieves the message.

Figure 8A:
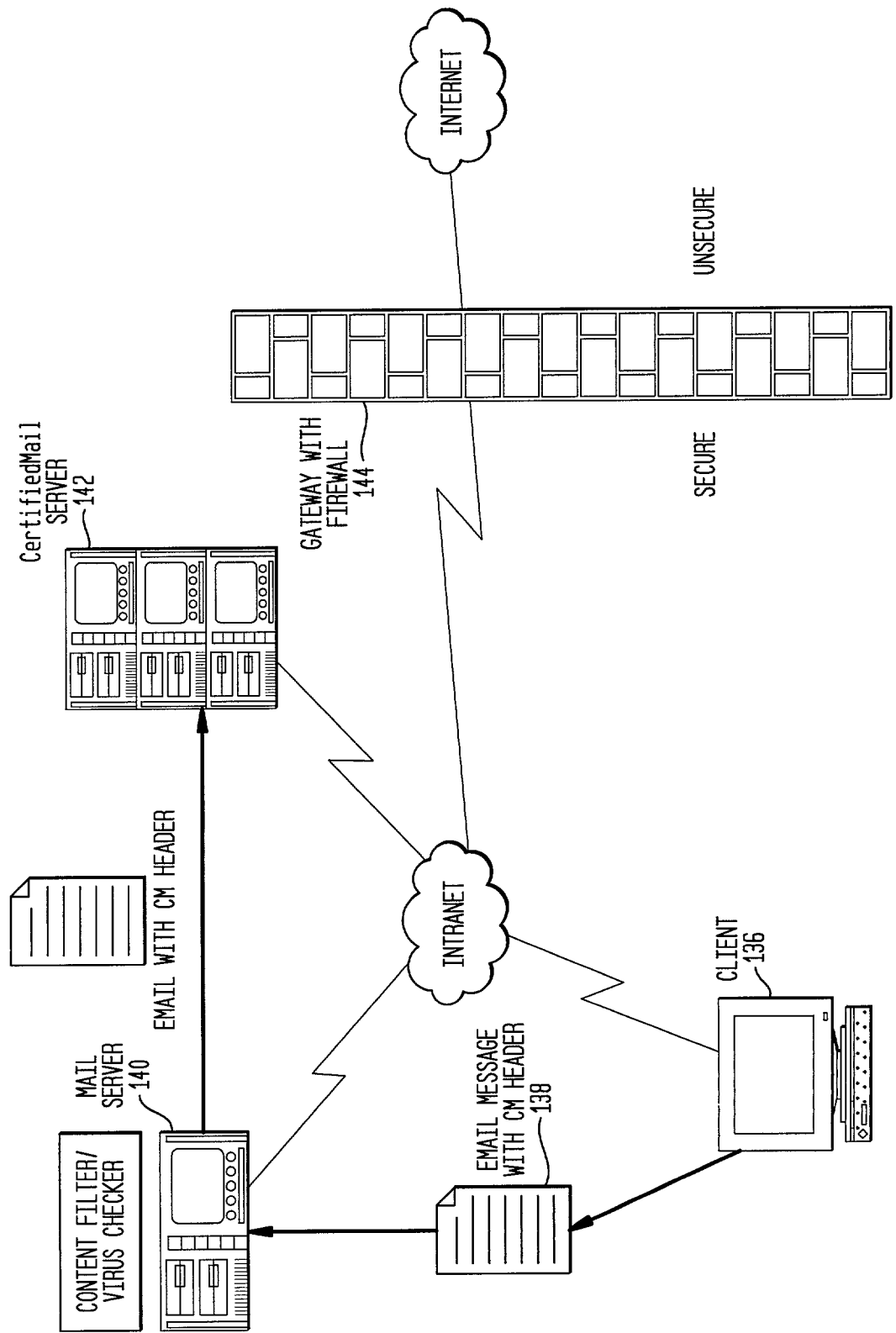

Turning now to FIGS. 8 and 8A, there is a flow chart and a functional block diagram, respectively, of a further embodiment of the present invention. In FIG. 8, as before, the user creates a message at step 122 on a personal computer using an e-mail client and again, the user selects the "Send Certified" button or menu selection at step 124. At this point the Send Certified code is run at step 126, however a header is added to the resulting outbound e-mail message that provides an identifier to the message. The message is sent to the server in step 128 that processes outbound messages for the e-mail client and, at step 130, a content filter is run by the internal server to review and check the content of the message as well as run a virus check. The internal mail server also identifies the "Send Certified" e-mail header that has been added to the message and forwards the message via SMTP to the internal secure mail server. At this point, it should be noted that the secure mail server is internal to the system and therefore is secure and encryption is not needed. Next, at step 132, the secure mail server SMTP process receives the "SendCertified" message and writes it to a drop directory. Finally, at step 134, as in the prior embodiment, the services running on the secure mail server processes the message, creates a new mailbox for any new recipients and notifies the recipient that a message is waiting so that the recipient can retrieve the message in the manner previously described.

Turning to the functional block diagram of FIG. 8A, the message is created on the personal computer 136 by the sender and the message sent, at 138 with the addition of a CertifiedMail header added to the message by the software in the personal computer 136. That message proceeds to the internal mail server 140 that processes outbound messages for the e-mail client and a content filter on the mail server 140 identifies the "Send Certified" e-mail header and forwards the e-mail to the internal secure mail server 142. As shown there is a firewall 144 that separates the secure communications side of the system and the unsecured communications side of the system, the former being within the internal system or intranet and the security maintained by the user. Thus, since all of the functioning, including the secure mail server 142 is on the secure side of the firewall 144, the message doe not need to be encrypted and decrypted. In this embodiment, therefore, the secure mail server 142 receives the message and writes it to a drop directory and the services running on that secure mail server processes the message, creates new mailboxes for any new recipients and notifies the recipient by normal internet connection that the message is waiting so that the recipient can retrieve the message.

Figure 9:
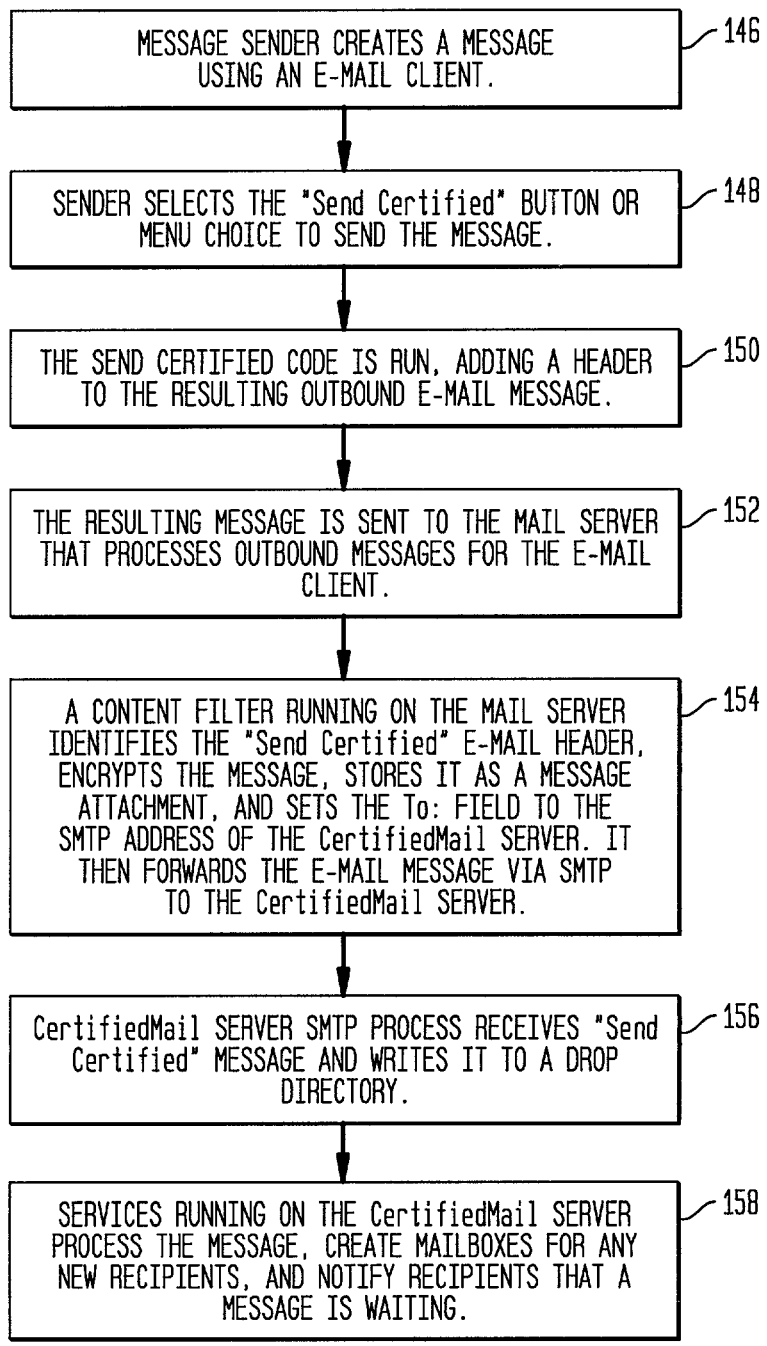

Next, with reference to FIGS. 9 and 9A there are a flow chart and a functional block diagram, respectively of a further embodiment of the present invention. In this embodiment, at step 146, the sender creates a message using an e-mil client. Next, as before, at step 148, the sender selects the "Send Certified" button or menu selection to send the message. At step 150, the Send Certified code is run and a header is added to the resulting outbound e-mail message identifying the message as a CertifiedMail message. The message is sent via the intranet service of the sender to the mail server, at step 152 that normally processes outbound message for the e-mail client. At step 154, a content filter running on the mail server identifies the "Send Certified" header, encrypts the message, stores it as a message attachment and sets the To: field to the SMTP address of the secure mail server. Thus the filtered and encrypted message is then sent to via SMTP to the secure mail server. As before, at step 156, the secure mail server SMTP process receives the "SendCertified" message and writes it to a drop directory and, finally, at step 158, the services running on the secure mail server process the message, create new mailboxes for any new recipients and notify recipients that a message is waiting for the recipient to retrieve the message in the usual manner.

In FIG. 9A, the functional block diagram outlines the FIG. 9 embodiment and where the sender creates the message on a personal computer 160 using an e-mail client and sends the message via an internal intranet 162 to the internal mail server 164 having a content filter and a virus checker. The software installed on the personal computer 160 also adds a Certified Mail header to the message, at 166. The message is encrypted by the internal mail server 164 and the filtered and encrypted message 168 is sent from the secure area behind the firewall 170 to the unsecured area via SMTP to the secure mail server 172 where the Certified Mail server 172 SMTP process receives the "Send Certified" message and writes it to a drop directory. The recipient is notified through the internet 174 and the message retrieved by the normal process previously explained. It should be noted, in this embodiment, that the filtering and encryption takes place to the left of the firewall 170, that is, in the secure area so that the encrypted message passes through the firewall 170 to the secure mail server 172.

Figure 10A:
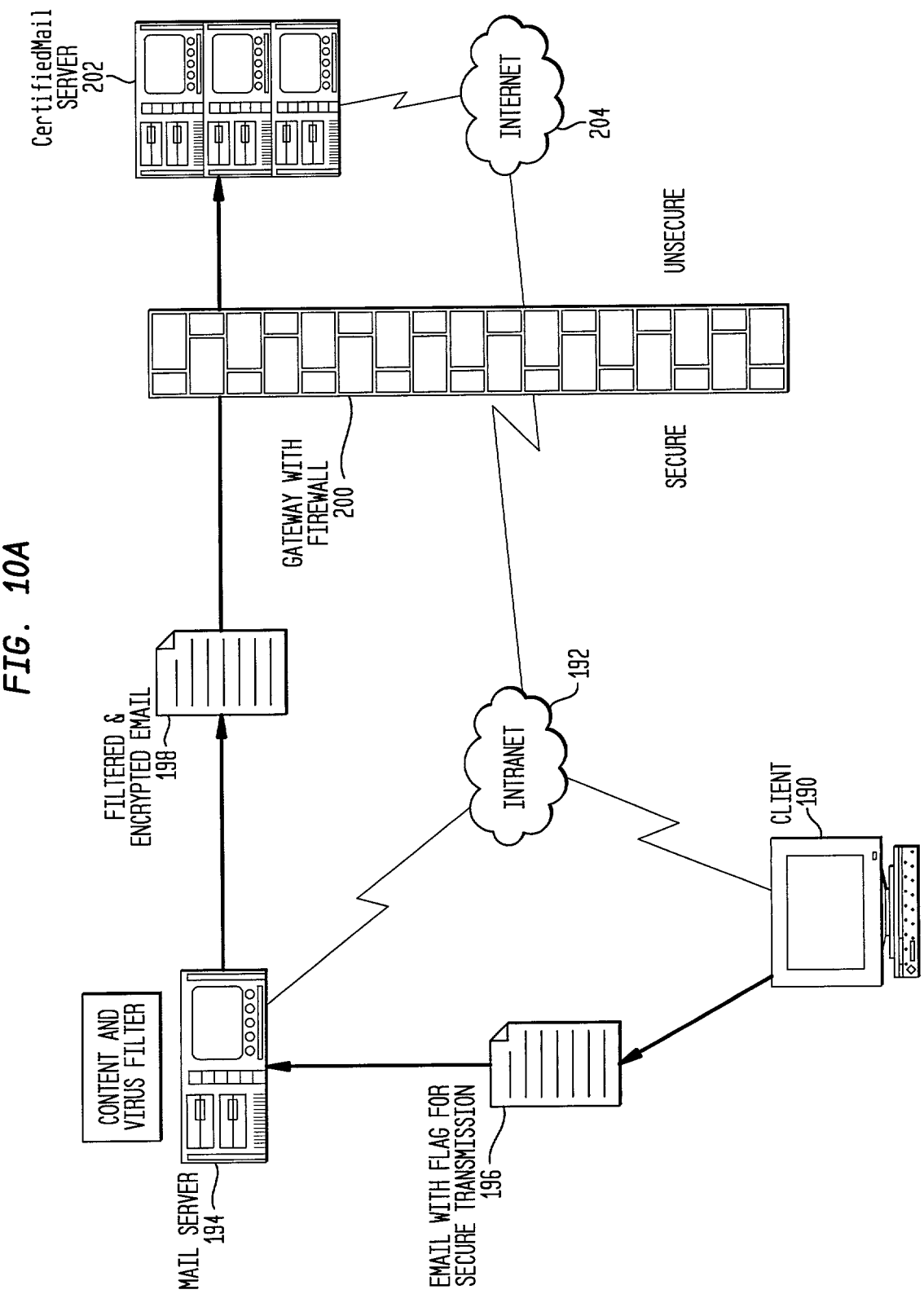

Finally, there is a further embodiment illustrated in FIG. 10 and FIG. 10A and showing respectively, a flow chart and a functional block diagram of the same embodiment. In FIG. 10, at step 174, the message is created by the sender using an e-mail client. The sender, at step 176 selects the "Send Certified" button or makes the selection from a menu to send the message and, at step 178, the message is transmitted via an intranet to the mail server that processes outbound messages for the e-mail client. At step 180 a content filter running on the mail server identifies the e-mail as requiring security via a preset rule. With this embodiment, the preset rule or tag may be any variety of identification tags that can be inserted in the text or other information inputted by the sender at the personal computer and inserted into the message. For example, the sender may designate all messages to a specific person to be tagged, there may be a code word in the address that tags the message or any other flagging means can be used by the sender that, correspondingly, is keyed to the content filter so as to be recognized by the content filter as indicating that the message is to be treated as a secure communication. The adding of the tagging identifier can be carried out by the normal software of the personal computer and not a part of the software for the secure mail system.

In any event, the content filter, at step 180, recognizes the particular tag so that the e-mail is identified as requiring a secure transmission. Thereafter, at step 182, the content filter encrypts the message, stores it as a message attachment and sets the To: field to the SMTP address of the secure mail server. As before, the message is then sent, at step 184, via SMTP to the secure mail server where, at step 186, the secure mail server SMTP process receives the "Send Certified" message and writes it to a drop directory. Lastly, at step 188, the services running on the secure mail server process the message, create mailboxes for any new recipients and notifies recipients that a message is waiting.

Accordingly, in FIG. 10A, showing a functional block diagram of the FIG. 10 embodiment, the sender creates the message on a personal computer 190 and sends that message via an internal intranet 192 to the mail server 194 that processes the outbound messages for the e-mail client and the message 196 itself has been tagged with some type of flag that is identified by the mail server 194 that has been programmed to recognize that flag. As indicated the flag itself may be any of a variety of indicators including, but not limited to a key word, an particular address, a subject or any other tag that is inserted into the message that can be recognized by a content filter of the internal mail server 194.

As such, the internal mail server 194 recognizes the tag in the message 196 and encrypts the message, along with running a virus check and/or the normal content filter, and stores that encrypted message as a message attachment and sets the To: field to the SMTP address of the secure mail server. The content filter of the internal mail server 194 thereby sends the filtered and encrypted message 198 across the firewall 200 to the unsecure area of the system, to the secure mail server 202 where the secure mail server 202 SMTP process receives the "Send Certified" message and writes that message to a drop directory. As before, therefore, the services running on the secure mail server 202 process the message, create mailboxes of any new recipients and notify the recipients that a message is waiting by means of the Internet 204. Thus, again, only the secured, encrypted message passes the firewall 200 to the unsecure communication area of the system.

Those skilled in the art will appreciate that the secure mail tool may be distributed for execution across one or several computing platforms and may include wireless devices, personal computer and other computing devices capable of handling electronic messages. Those skilled in the art will understand that the decision to distribute the tool execution on more than one computing device include factors such as the level of security that exists between computing platforms and the features and functions that are designed for the messaging system. All of these computing platforms considered either alone or in combination may be defined generally as a message originator for then transmitting the message to the secure mail server.

Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claims, is reserved.

What is claimed is:

1. An electronic mail system comprising:
    an email application having an interface for selectively initiating a first email sending process or a second email sending process for an email having content;
    a first email server that routes the email content toward an intended recipient without encrypting the email content when the first email sending process being initiated via the interface; and
    a second email server that initiates a secure message transaction for delivering the email content to an intended recipient when the second email sending process being initiated via the interface, the secure message transaction including providing secure access to the email content, irrespective of whether the intended recipient's email application is decryption enabled.

2. An electronic mail system according to claim 1 wherein the second email server causes an SSL link to be sent to the intended recipient via an email protocol, the SSL link when activated providing access to the email content.

3. An electronic mail system according to claim 1 further comprising a firewall, wherein the email application, first email server and second email server reside on a secure side of the firewall.

4. A method for transmitting an email comprising the steps of:
    launching an email application, the email application including an interface;
    selecting one of a plurality of email transmitting processes via the interface;
    if the selected email transmitting process requires secure message transmission to a recipient, inserting email content into an electronic message addressed to a server that initiates a secure link with the recipient.

5. The method of claim 4 comprising the further step of providing the recipient access to the email content via the secure link.

6. The method of claim 4 wherein the inserting step includes the steps of attaching a document file having the email content to the electronic message, the email content including address information and message information for the email.

* * * * *